No. 759,530. PATENTED MAY 10, 1904.
J. KELLY.
VALVE DEVICE.
APPLICATION FILED NOV. 2, 1903.
NO MODEL.
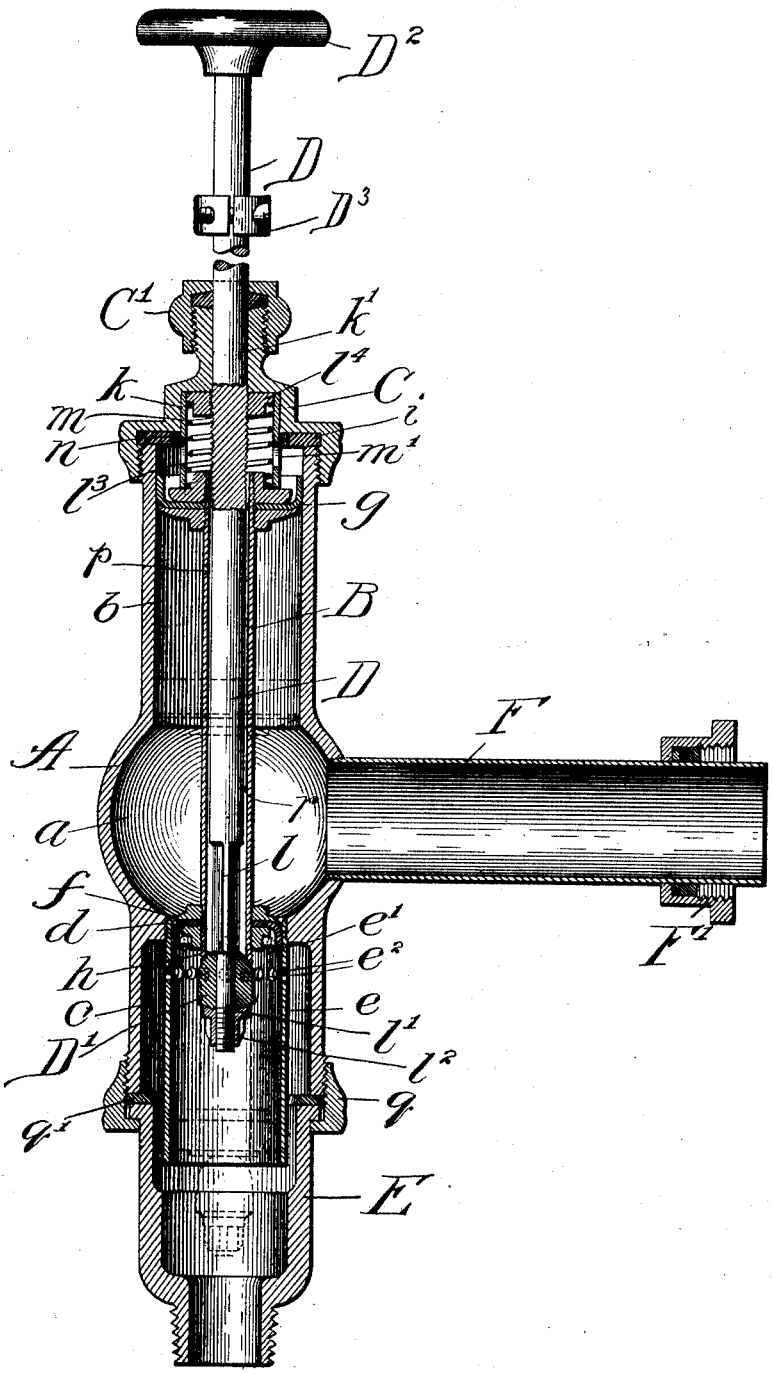
Witnesses:
John Enders
Ed. C. Davison
Inventor:
John Kelly,
By Dyrenforth, Dyrenforth & Lee,
Attys.

No. 759,530.

Patented May 10, 1904.

UNITED STATES PATENT OFFICE.

JOHN KELLY, OF CHICAGO, ILLINOIS.

VALVE DEVICE.

SPECIFICATION forming part of Letters Patent No. 759,530, dated May 10, 1904.

Application filed November 2, 1903. Serial No. 179,447. (No model.)

*To all whom it may concern:*

Be it known that I, JOHN KELLY, a citizen of the United States, residing at Chicago, in the county of Cook and State of Illinois, have invented a new and useful Improvement in Valve Devices, of which the following is a specification.

My invention relates to improvement in flushing-valves of the class adapted to open quickly and close slowly for the purpose of causing in each operation the passage through it of a quantity of liquid which will produce the amount of flushing necessary or desirable.

My object is to provide an improved valve device of the above class to be interposed in a pipe conducting water under pressure and which in operation is maintained normally closed by pressure of the water-supply, to be opened by the operator against said pressure, and which when thus opened will perform the flushing operation in each instance with equal certainty without regard to variations in pressure of the water-supply and always produce the desired afterfill of the toilet-bowl.

It is also my object to provide such a valve device of a simple, neat, and compact construction, rendering it particularly strong, durable, and free from danger of leaking.

The drawing shows a vertical section of my improved valve device.

A is a main body of the valve-shell, formed, preferably, with the enlarged or spherical part or chamber $a$, upper cylindrical part or chamber $b$, and lower cylindrical part or chamber $c$. Between the chambers $a$ $c$ is an inner annular shoulder $d$, threaded to receive and secure the upper end of an inner cylinder $e$, extending centrally downward in the chamber $c$. Extending through the cylinder $e$, near the top thereof, is a series of afterfill-openings $e'$, and a short distance below the same is a larger series of flushing-openings $e^2$.

B is a hollow piston-stem provided at its lower end with a piston-valve $f$, fitting and movable in the cylinder $e$, and provided at its upper end with a piston $g$ of greater diameter than the valve $f$ and fitting and movable in the upper end portion of the cylinder $b$. The lower end of the piston-stem B is shaped to form a valve-seat $h$. Screwed upon the upper end of the valve-shell A is a cap C, the joint between the shell and cap being rendered water-tight by a suitable gasket $i$. The cap C presents an inner annular surface $k$ and a central guide-opening $k'$, fitted at its upper end with a stuffing-box C'.

D is a stem of less diameter than the inner surface of the piston, stem, or tube B and fitting closely the stuffing-box C' and opening $k'$. The stem D passes downward through the said stuffing-box and opening and through the tube or stem B. Near its lower end the stem D is reduced in the construction shown, it being filed away to triangular shape in cross-section, as shown at $l$. Below the said part $l$ the stem is further reduced in cylindrical form and threaded, as shown at $l'$, where it carries a preferably rubber starting-valve D', held in place by a nut $l^2$.

Beneath the cap portion C the stem D is formed with a threaded part $l^3$ to receive a nut $l^4$. In the part $k$ of the cap C is a cylindrical liner $m$, extending downward into the chamber $b$ and provided with openings $m'$. In the liner and confined between the nut $l^4$ and the piston $g$ is a light spring $n$. In the stem or tube B, just beneath the piston $g$, is a small water-vent opening $p$. The stem D is provided at its upper end with a head or handle $D^2$ and an adjustable collar or stop $D^3$. At the lower end of the shell is a chambered coupling member E, held in place by the screw-collar $q$, a gasket $q'$ being interposed between the parts to render the joint water-tight. In one side of the chamber $a$ is an opening from which extends a pipe F, fitted at its end with a coupling F'.

In practice the valve device is connected at its coupling E to a water-supply pipe and at its coupling F' with a flushing-pipe leading to a toilet-bowl. The pressure of the water against the valve D' and against the piston-valve $f$ normally closes the said valve D' against the seat $h$ and forces the stems B D upward until the piston $g$ bears against the lower end of the liner $m$. When the parts are in this position, the piston $f$ is in the upper end portion of the cylinder $e$, shutting off communication between the chambers $c$ and $a$. Downward pressure upon the head or handle $D^2$ against the resistance of the spring $n$ unseats the starting-valve $D'$ and permits water to pass through the annular space $r$ between the stems B D into the chamber within the liner $m$ and through the openings $m'$ to bear against the upper side of the piston $g$. Some of the water passing upward in the space $r$ will escape through the small vent perforation $p$; but the piston $g$ being of greater diameter than the piston $f$ causes the downward pressure upon the piston $g$ to approximately balance the upward pressure agaist the piston $f$ while the valve $D'$ is open. Further downward pressure upon the head or handle $D^2$ causes the nut $l^4$ to completely compress the light spring $n$ and press upon the piston $g$ to force the stem or tube B and piston $f$ downward until the latter reaches a point below the series of openings $e^2$, as indicated by dotted lines. Water in comparatively large volume then passes through the openings $e^2$ $e'$ to the chamber $a$ and thence through the pipe F to perform the flushing. When pressure is released from the head or handle $D^2$, the stem D is raised by the water-pressure and spring $l^3$ to close the valve $D'$. Following this the continued slow escape of water through the perforation $p$ gradually drains the space above the piston $g$, permitting the water-pressure against the piston $f$ to slowly raise the said piston, stem, or tube B and parts carried thereby. In rising the piston $f$ first shuts off the flow of water through the large series of flushing-openings $e^2$ and then through the small series of perforations $e'$. It will be understood that the water entering through the valve $D'$ operates as a water-cushion to retard the rise of the stem B and piston or valve $f$ to effect the prolonged flushing desired, and the operation of the piston or valve $f$ in first slowly closing the large series of openings $e^2$ and then the small series of openings $e'$ prevents such sudden cutting off of the flow of water as would produce jar or pounding. Furthermore, the rush of water when the flushing-openings $e^2$ are uncovered and the water-pressure is strong tends to sweep across the toilet-bowl with great force, which if the water were suddenly cut off would tend to leave no water in the bowl and trap. In practice after the openings $e^2$ are closed the water entering through the smaller series $e'$ flows more gently to the toilet-bowl, producing the desired afterfill.

The piston $g$ has an upwardly-cupped preferably leather ring and the valve or piston $f$ a downwardly-cupped preferably leather ring, insuring in each case a water-tight bearing-surface very durable and free from danger of binding. All parts of the valve device constructed as described are particularly strong and durable, and while I prefer to construct them throughout as shown and described they may be variously modified in the matter of details of construction without departing from the spirit of my invention as defined by the claim.

In practice the handle is usually pressed down as far as it will go and is then immediately released. To produce the desired amount of flushing, it may be necessary that the valve $f$ move quite to the lower end of the cylinder $e$ or a lesser distance. This may be regulated by the position of the stop $D^2$ on the stem D.

What I claim as new, and desire to secure by Letters Patent, is—

In a flushing-valve device, the combination of the valve-shell having a lower water-inlet and a lateral water-outlet, a cylinder between the inlet and outlet having lateral flushing and afterfill openings respectively in different planes, a piston-valve in said cylinder movable under pressure from the inlet to successively close the flushing and afterfill openings, an open-ended hollow stem for the piston-valve having a water-vent opening, a cushioning-piston on the upper end of said stem the area of which is greater than the area of the piston-valve, a cushioning-chamber for the piston in communication with the hollow stem, a valve-stem extending through the shell and loosely through and beyond the hollow stem and having an adjustable stop for limiting its movement, a starting-valve on the lower end of the valve-stem normally seating against the lower end of the hollow stem, a shoulder on the valve-stem above the cushioning-piston, and a spring coiled around the valve-stem between the shoulder and cushioning-piston.

JOHN KELLY.

In presence of—
WALTER N. WINBERG,
W. B. DAVIES.